US011082213B2

(12) United States Patent
Cioraca

(10) Patent No.: US 11,082,213 B2
(45) Date of Patent: Aug. 3, 2021

(54) SWITCHING AUTHENTICATION AND ENCRYPTION OF CONTENT BETWEEN KEYS BASED ON A KEY AVAILABILITY ASSURANCE VALUE

(71) Applicant: General Electric Technology GmbH, Baden (CH)

(72) Inventor: Anca Lucia Cioraca, Markham (CA)

(73) Assignee: General Electric Technology GmbH, Baden (CH)

( * ) Notice: Subject to any disclaimer, the term of this patent is extended or adjusted under 35 U.S.C. 154(b) by 351 days.

(21) Appl. No.: 16/289,100

(22) Filed: Feb. 28, 2019

(65) Prior Publication Data
US 2020/0280434 A1   Sep. 3, 2020

(51) Int. Cl.
*H04L 9/08* (2006.01)
*H04L 29/06* (2006.01)
*H04L 9/14* (2006.01)

(52) U.S. Cl.
CPC .............. *H04L 9/0819* (2013.01); *H04L 9/14* (2013.01); *H04L 63/0435* (2013.01); *H04L 2209/60* (2013.01)

(58) Field of Classification Search
CPC .................................................... H04L 9/0819
See application file for complete search history.

(56) References Cited

U.S. PATENT DOCUMENTS

| 9,742,749 | B1 | 8/2017 | Richter et al. |
| 9,871,653 | B2 | 1/2018 | Weis et al. |
| 2007/0160208 | A1 | 7/2007 | MacLean et al. |
| 2007/0192790 | A1* | 8/2007 | Takano .............. H04N 21/4408 725/31 |
| 2008/0235522 | A1* | 9/2008 | Suzuki ...................... H04L 9/12 713/193 |
| 2012/0266209 | A1 | 10/2012 | Gooding et al. |
| 2013/0142336 | A1 | 6/2013 | Fries et al. |
| 2015/0281278 | A1 | 10/2015 | Gooding et al. |
| 2015/0350947 | A1* | 12/2015 | Khayrallah ......... H04W 12/033 380/31 |
| 2018/0241707 | A1* | 8/2018 | Sarafa ............... H04W 12/0431 |

FOREIGN PATENT DOCUMENTS

WO   2007/142816 A2   12/2007

OTHER PUBLICATIONS

Search Report issued in European Patent Application No. 20170353.5, dated Jul. 17, 2020, 8 pages.

* cited by examiner

*Primary Examiner* — Bradley W Holder
(74) *Attorney, Agent, or Firm* — Eversheds Sutherland (US) LLP

(57) ABSTRACT

The technologies described herein are generally directed toward facilitating switching encryption keys based on an assurance value. According to an embodiment, a method can comprise receiving, by a device comprising a processor and memory, an assurance value from a key distribution server. The method can further comprise, based on the assurance value, switching, by the device, encryption of a content item from being by a first encryption key to being by a second encryption key, wherein the assurance value is determined in response to a receiving of a second decryption key by a content consuming device, and wherein the first and second decryption keys are generated respectively to decrypt the content item encrypted by the first and second encryption keys.

9 Claims, 10 Drawing Sheets

SWITCHING AUTHENTICATION AND ENCRYPTION OF CONTENT BETWEEN KEYS BASED ON A KEY AVAILABILITY ASSURANCE VALUE

TECHNICAL FIELD

The disclosed subject matter relates generally to secure communications, and more specifically to the use of keys for authentication and encryption.

BACKGROUND

When using keys for encrypting and authenticating secure communications between a system of computers with encryption and decryption keys, to promote security the keys used are changed periodically. When the system uses a key source server to distribute the keys, communication problems can cause delays in the delivery of new decryption keys to some computers. Because these delays can cause communication problems when new keys are used for encryption, but no matching new decryption keys are available. It is therefore desirable to determine a more reliable approach for distribution of keys.

The above-described background relating to secure communications is merely intended to provide a contextual overview of some current issues, and is not intended to be exhaustive. Other contextual information may become further apparent upon review of the following detailed description.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
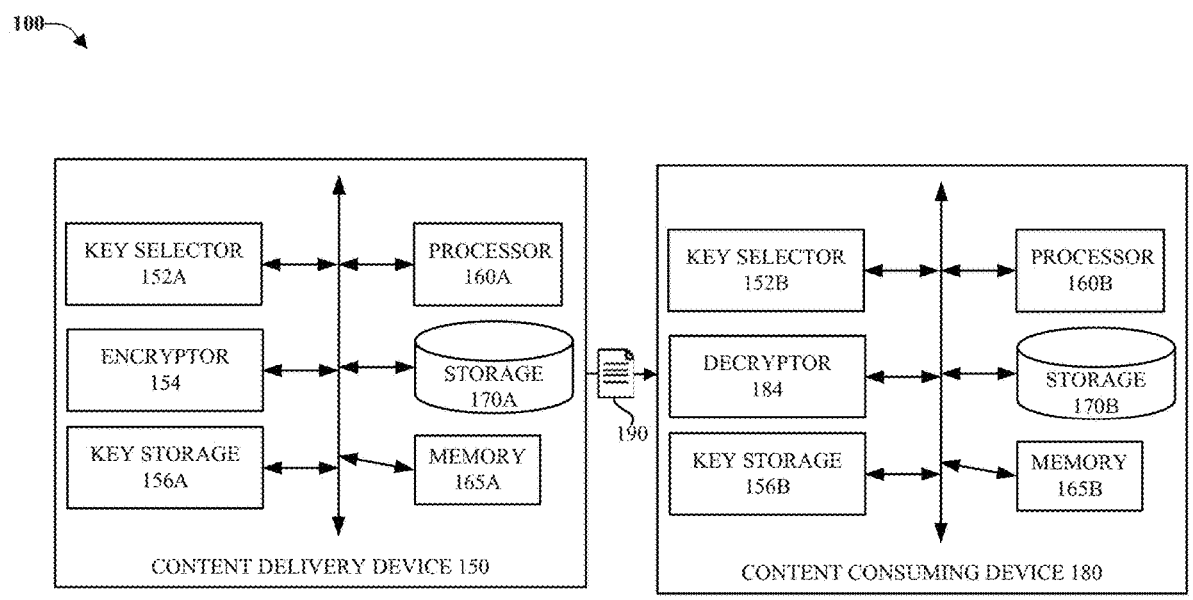
FIG. 1 illustrates a block diagram of an example, non-limiting system that includes a content delivery device (CDD) communicating a content item to a content consuming device (CCD), in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure.

The following description and the annexed drawings set forth in detail certain illustrative aspects of the subject matter. However, these aspects are indicative of but a few of the various ways in which the principles of the subject matter can be implemented or employed. Other aspects, advantages, and novel features of the disclosed subject matter will become apparent from the following detailed description when considered in conjunction with the provided drawings. In the following description, for purposes of explanation, numerous specific details are set forth to provide a understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices comprising programmable processors that execute machine executable instructions to facilitate performance of operations described herein. Examples of such devices can be devices comprising circuitry and components as described in FIGS. 9 and 10.

As used in this application, the terms "component," "system," "platform," "interface," "node", "source", "agent", and the like, can refer to or can comprise a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers. Also, these components can execute from various computer readable media having various data structures stored thereon. The components may communicate via local or remote processes such as in accordance with a signal having one or more data packets (e.g., data from one component interacting with another component in a local system, distributed system, or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

FIG. 1 illustrates a block diagram of an example, non-limiting system 100 that includes content delivery device (CDD) 150 communicating content item 190 to content consuming device 180. According to multiple embodiments, CDD 150 and CCD 180 can respectively include memory 165A-B that can store one or more computer and/or machine readable, writable, and/or executable components and/or instructions that, when executed by processors 160A-B, can facilitate performance of operations defined by the executable component(s) and/or instruction(s). For example, memory 165A-B can store computer and/or machine readable, writable, and/or executable components and/or instructions that, when executed by processors 160A-B, can facilitate execution of various functions described herein relating to CDD 150.

Example components of CDD 150 and CDD 180 can respectively include, but are not limited to key selectors 152A-B, encryptor 154/decrpytor 184, and key storage 156A-B, in one or more embodiments. These example components can facilitate execution of various functions described herein relating to CDD 150 and CCD 180. CDD 150 can receive a first and a second encryption keys that can be stored in key storage 156A, from a key distribution server (not shown). Stored encryption keys can be used for encryption, and CDD 150 can, switch by key selector 152A, encryption by encryptor 154 of content item 190 from being by the first encryption key to being by the second encryption key. Once encrypted, CDD 150 can communicate content item 190 to CCD 180. It should also be noted that CCD 180 can be one of multiple CCDs in a communication group. In one or more embodiments, members of the communication group can receive decryption keys from the key distribution server and receive content item 190 in a way similar to the approach described with respect to CCD 180.

It should be noted that, as used herein, the actions of encryption and decryption can include the encryption and decryption of content, but can also include an authentication function, that is, verifying a digital signature of the content, while the content is not encrypted. As used herein encryption and decryption can refer to one or both of respectively encrypting and decrypting the content or signing the content and verifying the signature.

It should also be noted that, in one or more embodiments, encryption and decryption keys can be different, e.g., the encryption key will not decrypt the encrypted content. An example of this is shown in an example depicted in FIG. 2 below, e.g., encryption key 292A-B is described as be different from decryption keys 290A-B. An alternative embodiment however, uses symmetric keys for encryption and decryption, e.g., the same key is used for both encryption and decryption. Notwithstanding the discussion of some embodiments herein as using asymmetric keys, these embodiments can also be implemented with symmetric keys. Stated differently, the type of key delivered to CDD 180 is of no consequence to the operation of embodiments described herein.

In one or more embodiments, CCD 180 can receive a first and a second decryption key from the key distribution server and, during the interval, can select by key selector 182, either the first or the second decryption key, stored in key storage 186, for decryption by decryptor 184 of content item 190 received from CDD 150, based on a determination of the switching, by CDD 150, of the encryption from the first encryption key to the second encryption key.

In some embodiments, memory 165A-B can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165A-B are described below with reference to system memory 916 and FIG. 9. Such examples of memory 165A-B can be employed to implement any embodiments of the subject disclosure.

According to multiple embodiments, processors 160A-B can comprise one or more processors and/or electronic circuitry that can implement one or more computer and/or machine readable, writable, and/or executable components and/or instructions that can be stored on memory 165A-B. For example, processors 160A-B can perform various operations that can be specified by such computer and/or machine readable, writable, and/or executable components and/or instructions including, but not limited to, logic, control, input/output (I/O), arithmetic, and/or the like. In some embodiments, processors 160A-B can comprise one or more central processing unit, multi-core processor, microprocessor, dual microprocessors, microcontroller, System on a Chip (SOC), array processor, vector processor, and/or another type of processor. Examples of processors 160A-B can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, CDD 150 can further comprise various computer and/or computing-based elements described herein with reference to operating environment 900 and FIG. 9. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
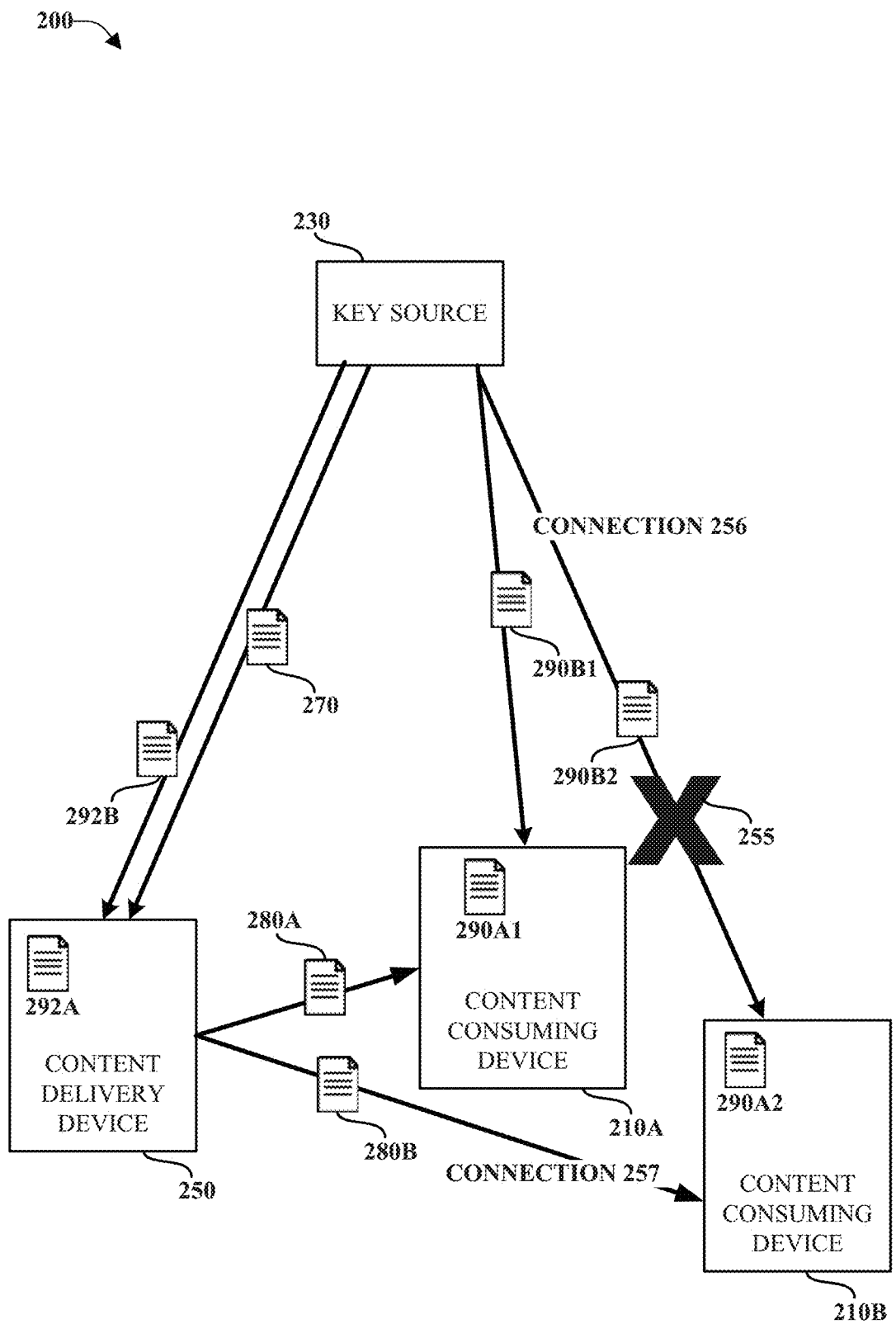
FIG. 2 depicts a system that can facilitate the communication of content items by the content delivery device, encrypted with an encryption key to the content consuming devices, in accordance with aspects of the subject disclosure.

FIG. 2 depicts a system 200 that can facilitate the communication of content items 280A-B, by CDD 250 encrypted with encryption key 292A to CCDs 210A-B, respectively. At CCDs 210A-B, decryption keys 290A1-A2 are initially, in this example, used to decrypt content items 280A-B. For purposes of brevity, description of like elements and/or processes employed in other embodiments is omitted.

In one or more embodiments, the encryption keys 292A-B and decryption keys 290A1-A2 and 290B1-B2 can be received from key source 230 (e.g., key distribution server discussed above is an example key source. Key source 230 is generally a system operating on one or more computer server devices which generally can, at different intervals, generate and distribute encryption keys and matching decryption keys to CDDs and CCDs, respectively. As described above, in an alternative embodiment, encryption keys 292A-B are symmetric keys with decryption keys 290A1-A2 and 290B1-B2 respectively (e.g., they are the same keys), although this characterization is non-limiting and other types of encryption and decryption keys can be used. An example implementation of key source 230 includes, but is not limited to, a Key Distribution Center (KDC) server.

In the operation of system 200 of FIG. 2, CDD 250 can receive a first encryption key 292A from key source 295. In one or more embodiments, key source 295 generates first decryption keys 290A1-A2 at a periodic interval. Because, in an example, key expiration times are longer than the key generation period, at any time, two non-expired keys can be available for delivery.

Expanding on the above description, in normal operation, upon startup of CDD and CCD devices, these devices can request respectively encryption and decryption keys (or the same symmetric keys described above). Considering the operation of CCDs, decryption (or symmetric) keys can be communicated to CCDs 210A-B for use decrypting content items 280A-B from CDD 250, these respective operations matching up so decryption keys 290A1-A2 are available and used to decrypt a content items 280A-B when received from CDD 250. It should be noted that, in example implementations of CDD 250 and CCDs 210A-B, these devices can respectively be publishing and subscriber devices.

In the example depicted in FIG. 2, in a normal operation of system 200, periodically, key source 295 can generate pairs of encryption/decryption keys (e.g., 292B and 290B1-B2) for use by CDD 250 and CCDs 210A-B. In one or more embodiments, regular changing of security keys can improve the security of the delivery of content items 280A-B. It should be noted that, as discussed herein, while key source 230 is generally described as a single source, operations of key source 230 can be distributed across multiple, geographically dispersed servers that respectively distribute related encryption and decryption keys to CDDs and CCDs.

Continuing the example of FIG. 2, the normal operation described above can be interrupted by an interruption 255 in connection 256, for example, in the communication of decryption key 290B2 to CCD 210B. In this example, if CDD 250 switches from first encryption key 292A to second encryption key 292B, CCD 210A can use received second decryption key 290B1 to decrypt content item 280A, but due to interruption 255 of connection 256, second decryption key 290B2 cannot be delivered to CCD 210B at the same time second decryption key 290B1 is delivered to CCD 210A. Based on interruption 255, if CDD 250 switches to second encryption key 292B, CCD 210B will not be able to decrypt content item 280B. It should be noted that, while interruption 255 interrupts connection 256 with key source 230, CCD 210B can still have connection 257 available.

Figure 3:
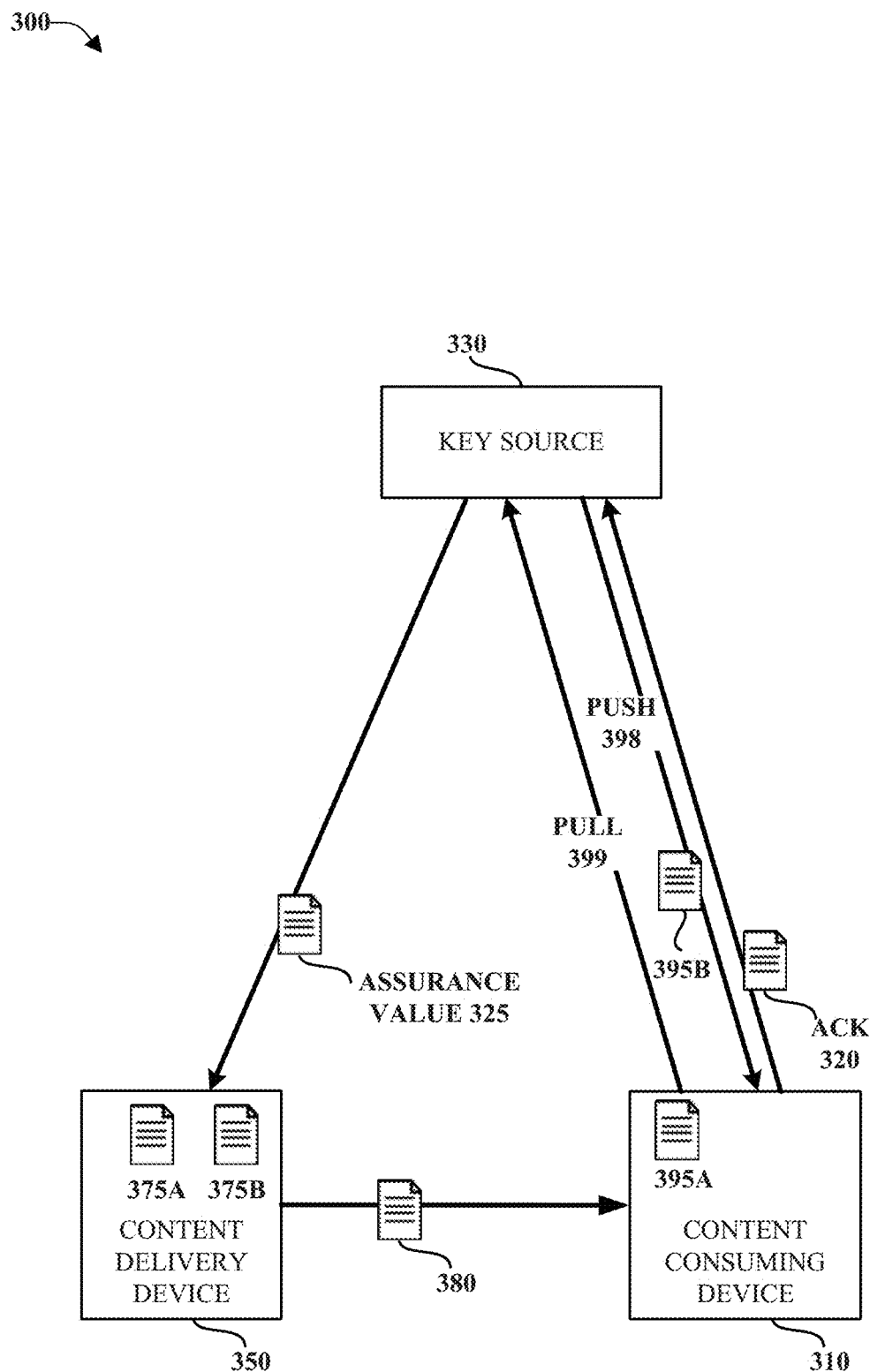
FIG. 3 depicts an example operation where a key source can determine a key availability assurance value (hereinafter "assurance value"). In one or more embodiments, the assurance value can provide a measure of assurance value that a key sent to a group of devices has been successfully received, based on an acknowledgement from these content consuming devices indicating that the devices received the key, in accordance with aspects of the subject disclosure.

FIG. 3 depicts an example operation where key source 330 can determine an assurance value 325 based on an acknowledgement (ACK) 320 from CCD 310 indicating that the device received second decryption key 395B. For purposes of brevity, description of like elements and/or processes employed in other embodiments is omitted.

In one or more embodiments, system 300 operates similar to system 200 above, with first encryption key 375A used by CDD 350 to encrypt content item 380, and first decryption key 395A, used by CCD 310 to decrypt content item 380. As noted above, after a certain interval (discussed below) content delivery service can switch keys used for encryption, e.g., from first encryption key 375A to second encryption key 375B. By the time that switch occurs, CCD 310 can have received second decryption key 395B, and that device can switch keys used for decryption to match the switch by CDD 350.

In contrast to FIG. 2, FIG. 3 depicts that CCD 310 can send an acknowledgement (ACK) 320 to key source 395 that acknowledges that CCD 310 received second decryption key 395B. In one or more embodiments, as shown in FIG. 1, key source can send decryption keys (e.g., second decryption keys 290B1-B2) to multiple CCDs 210A-B. In the embodiment depicted in FIG. 3, multiple CCDs can send ACKs 320 to key source 395.

It should be noted that, in some implementations, CCD 310 sends ACK 320 when CCD has requested (issued a pull request) decryption key 395B from key source 330. In some implementations, when key source delivers decryption key 395B to CCD 310 using a push 398 mechanism, an ACK 320 is not sent. In other implementations, e.g., when key source uses a push 399 mechanism that requires an ACK 320 to be sent by a receiving device, CCD 310 can send an ACK 320 in response to pushed decryption key 395B. In some implementations, assurance value 325 is not based on a receiving of decryption key 395B, e.g., because no ACK 320 was received.

In one or more embodiments, to generate assurance value 325, key source 330 can compare the received ACKs 320 to the number of decryption keys 395B that were distributed to CCDs 310. Based on this number, in one or more embodiments, key source 330 can determine assurance value 325 to reflect the portion of CCDs 310 that have received the updated second decryption key 395B. For example, an assurance value can be a percentage value that corresponds to the percentage of second decryption keys 395B for which an ACK 320 was received as compared to the total number of second decryption keys 395B that were sent out. Assurance value 325 can be a variety of different metrics, including, but not limited to, a key delivery assurance (KDA) factor discussed below with FIG. 6.

Figure 4:
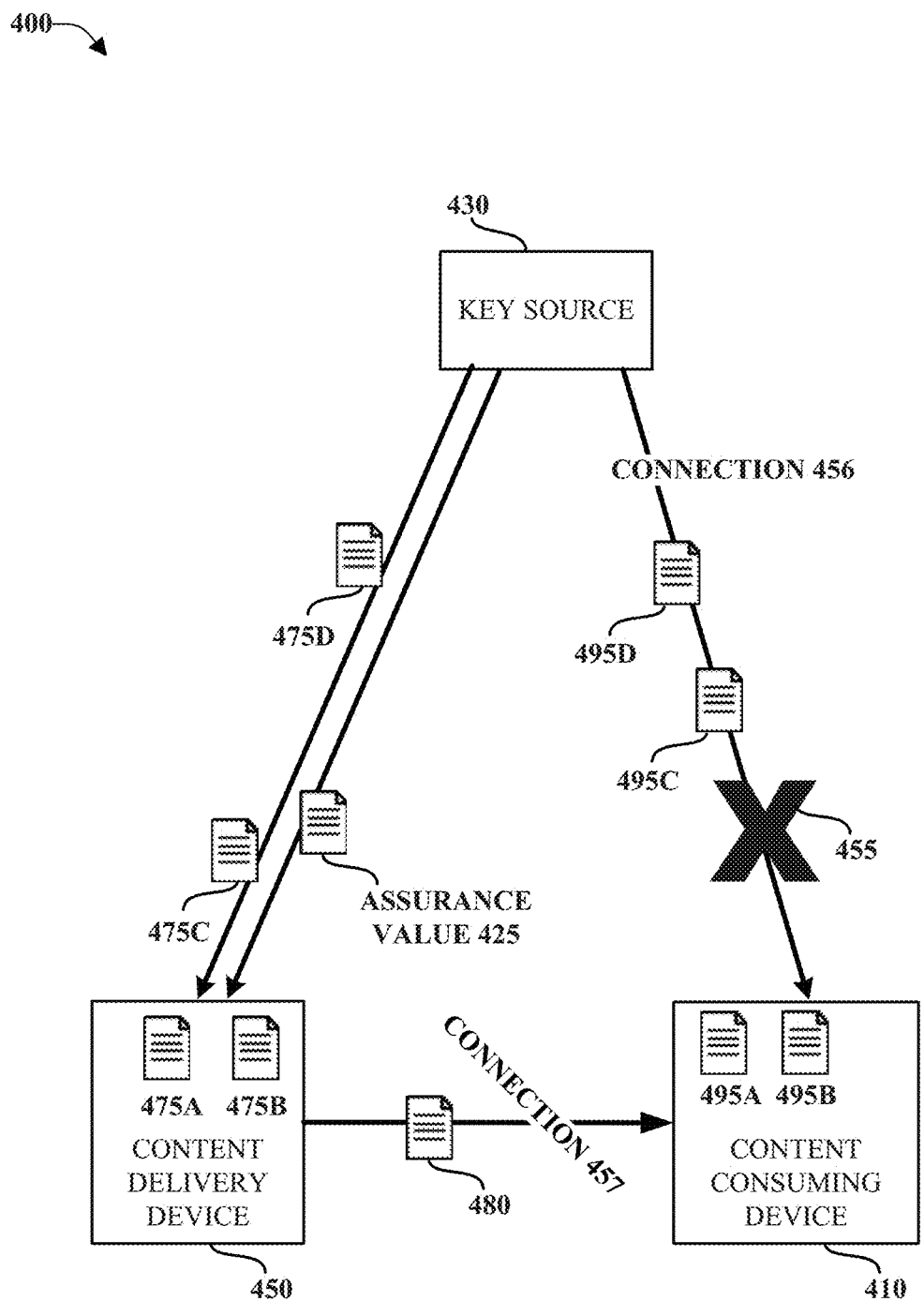
FIG. 4 depicts a system that can facilitate the communication of a content item using a connection by the content delivery device, encrypted with an encryption key to the content consuming device, in accordance with aspects of the subject disclosure.

FIG. 4 depicts a system 400 that can facilitate the communication of content item 480 using connection 457, by CDD 450 encrypted with encryption key 475A to CCD 410. For purposes of brevity, description of like elements and/or processes employed in other embodiments is omitted.

Figure 5:
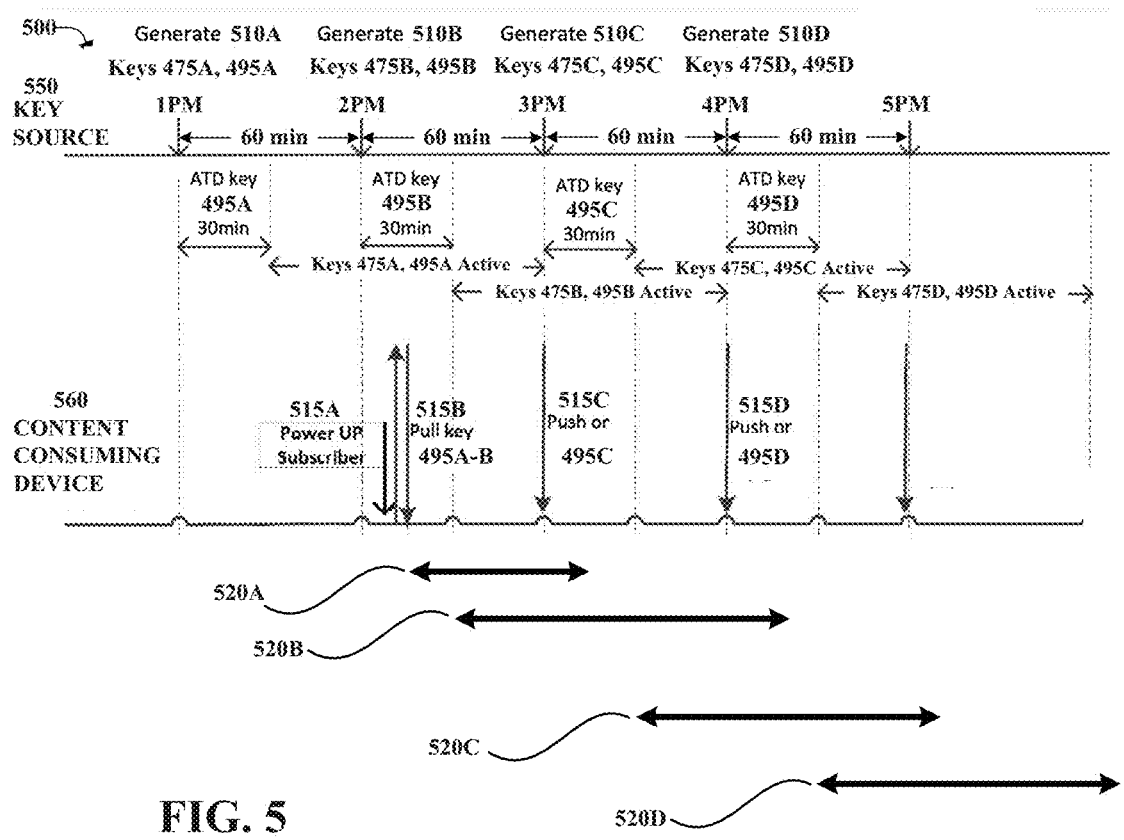
FIG. 5 illustrates an example timeline for a content consuming device and a key source, that can describe the overlapping activation times of decryption keys used by one or more embodiments, in accordance with aspects of the subject disclosure.
Figure 6:
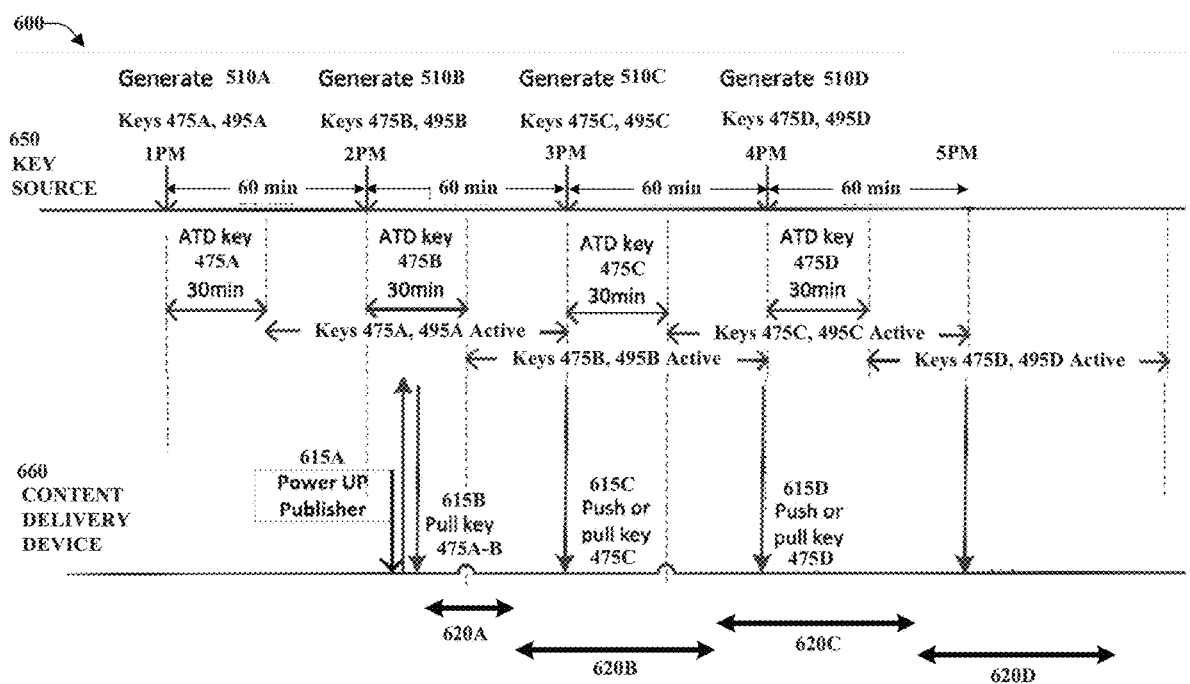
FIG. 6 illustrates an example timeline for a content delivery device and the key source, that can describe the selection of encryption keys, in accordance with aspects of the subject disclosure.

As described throughout this disclosure, over time, CDD 450 can periodically switch encryption keys from one key to a next key, e.g., as depicted in FIGS. 5 and 6 below, from keys 475A to 475D. One or more embodiments describe an approach that can use multiple active decryption keys with a first key having a activation time earlier than a second key.

Generally speaking, in a system with a key source providing pairs of encryption and decryption keys at regular intervals, to initialize system 400, CDD 450 can send a request for a first encryption key 475A and a second encryption key 475B, e.g., a request for two keys, instead of just one. Also, at this stage CCD 410 can send a request for a first decryption key 495A and a second decryption key 495B, e.g., also a request for two keys, instead of just one. As explained further below, in one or more embodiments, this request for two keys to be delivered at the same time can be done at the beginning of the process and need not be done for subsequent sets of keys.

In this example system, key source 430 can provide multiple keys to the same source with the keys having different activation times, but the same lifespan time. In an example, key 475A is active for 90 minutes, and has an activation time delay (ATD) that is thirty (30) minutes after the key is generated. In an example, key 475A, generated at 1 PM, can be active, used for encryption, from 1:30 PM to 3 PM. In this example, this key can be requested and received by CDD at 2:15 PM, the first key being active when received.

In this example, key source 430 can generate new key pairs 60 minutes before the scheduled expiration time of a previous key. Thus, this example, a second key 475B can be generated at 2:00 PM, with an activation time at 2:30 PM, this time being before the expiration time of the first key. Returning to the request for two keys noted above, because CDD 450 requests two keys when it powers up, and both keys have been requested at 2:15 PM, while the first key was generated at 1 and the second key at 2, both first encryption keys 475A-B can be delivered and stored for use on CDD 450.

At event 515A, decryption keys 495A-B corresponding to first and second encryption keys 475A-B are provided by the key source. In this example, keys 495A-B respectively have the same activation, duration, and deactivation times as encryption keys 475A-B, e.g., first decryption key 495A was generated at 1 PM with an activation time at 1:30 PM and a duration of ninety (90) minutes from activation, e.g., active from 1:30 PM to 3 PM. Similarly, second decryption key 495B was generated at 2:00 PM with an activation time at 2:30 PM and a duration of ninety (90) minutes from activation, e.g., active from 2:30 PM to 4:00 PM.

In one or more embodiments, as discussed above, upon receipt of first and second decryption keys 495A-B, CCD 410 can send an ACK (e.g., ACK 320 discussed above) that can acknowledge receipt of second decryption key 495B. Key source 430 can receive ACK 320 and combine it with other ACKs 320 received from other CCDs to generate assurance value 425. In one or more embodiments, assurance values can determined for each key delivered. Thus, in this example, an assurance value can provide an indication of the portion of CCDs 410 that have received the second decryption key 495B.

FIG. 5 illustrates an example timeline 500 for a CCD 410 and key source 430 that can describe the overlapping activation times of decryption keys used by one or more embodiments, e.g., first and second decryption keys 495A-C. Discussed below, related FIG. 6 illustrates an example timeline 600 for CDD 450, describing events that can occur at CDD 450 in relation to the actions described below in timeline 500. For purposes of brevity, description of like elements and/or processes employed in other embodiments is omitted.

As noted above, CCD 410 represents one device of potentially many CCDs in a group of devices that can receive content items from CDD 450, e.g., using a multicast protocol. As described below, when CCD 410 performs an action, one or more other CCD devices in the multicast group can also perform the same or similar action. As noted above however, the results obtained by the other CCDs can differ from CCD 410 discussed below. For example, given a request (e.g., a pull request) for a decryption key from both CCD 410 and another CCD from the multicast group, the former can receive the decryption key and, as discussed above with FIGS. 3 and 4, the latter can have the decryption key delayed due to network events.

The timeline 500 depicts events occurring at key source 430 and at CCD 410, and has sections 550 and 560 respectively detailing these events. It is important to note that, in one or more embodiments, CCD 410 and CDD 450 can operate as clients of key source 430, e.g., requesting encryption keys 475A-C and decryption keys 495A-C respectively (e.g., issuing pull requests for keys), and receiving keys (e.g., receiving keys either pushed without being requested or in response to the pull request).

Key source section 550 of timeline 500 has key generation events 510A-D for the generation of keys labeled 475A-D and 495A-D. In this example, the keys that can be generated by the key source are pairs of symmetrical encryption/decryption keys, e.g., key 495A received by CCD 410 has a related encrypting key 475A received by CDD 450. These example keys generated have an ATD of 30 minutes and an active life duration of 90 minutes.

Thus, starting at time 1 PM, key 475A can be generated, and it can become active for 90 minutes after the 30 minute ATD time, e.g., a lifespan from time 1:30 PM to time 3 PM in timeline 500. In this example, key source 430 generates a new pair of keys every 60 minutes, thus, 60 minutes after key 475A is generated, key 475B can be generated. Based on the key generation of key 475B, it is important to note that, e.g., at 2:15 PM, two keys (e.g., 495A and 495B) have been generated, but only key 495A is active at a CCD.

As described above, in one or more embodiments, at the time CCD 410 is powered up, CCD 410 may request the active decryption key 495A and any newly generated decryption key (e.g., key 495B), from the key source. As described above, after key generation events 510A-B, both keys 495A-B have been generated by key source 430, with key 495A being active and key 495B being in an APD phase. Thus, in this example, when CCD 410 requests two decryption keys at event 515B, key source 430 can provide keys 495A-B to CCD 410 in response to the request.

In one or more embodiments, because key source 430 and CDD/CCD can be powered on at different times, the first time CDD/CCD are powered up they will use a pull mechanism to get their keys from the key source, as the pull also ensures the key source and CDD/CCD authenticate each other before they trust to exchange keys. In an alternative embodiment, for example, after an initial pull, key source 430 can use a push protocol to distribute the required encryption and decryption keys to CDD 450 and CCD 410 respectively.

Arrows 520A-D represent times when encryption keys 495A-D are respectively active at CCD 420, e.g., active keys at CCD 410 are able to be used by CCD 410 to decrypt content items received by CCD 410. In one or more embodiments, content items 480 received have a label that can identify which decryption key can be used to decode the content item. If the decryption key is active on CCD 410 when a corresponding content item 480 is received, the appropriate decryption key is retrieved and used for decryption.

As depicted in FIG. 5, after event 515B (e.g., receiving the keys 495A-B), because key 495B key is not active until 2:30 PM, CCD 410 can decrypt content items that have been encrypted using the 495A encryption key. In this example, as discussed below with FIG. 6, CDD 450 can begin encrypting content with key 475A immediately.

If a content item is received before 2:30 PM that has been encrypted with the encryption key 475B, because decryption key 495B is not active before 2:30 PM on CCD 410, this content item cannot be decrypted, and communication can be interrupted with CDD 450. To avoid this potential problem, in one or more embodiments, both keys that are initially requested for content item 480 (e.g., at event 515A) can be configured to be active at CCD 410 as soon as they arrive at CCD 410. This approach is not shown in timeline 500, but could be reflected in timeline 500 by arrows 520A-B beginning at the same point (e.g., at event 515B).

Returning to the example shown in FIG. 5, during the time period that key 495A is active on CCD 410 (e.g., arrow 520A), key 495B becomes active at CCD 410 at its ATD, which is at 2:30 PM. Thus, during the period from 2:30 PM (e.g., the activation of key 495B on CCD 410) to 3 PM (the expiration of key 495A), both keys 495A-B are active on CCD 410 and available to decrypt content items (e.g., packets) that are encrypted by encryption keys 475A-B, respectively. In some circumstances addressed by one or more embodiments, content items encrypted with either key can arrive at this time, even though CDD 450 has switched from encrypting content items from key 475A key to key 475B. This can occur because content items encrypted with key 475A key can be delayed and subsequently arrive later than content items communicated after their transmission. As discussed further below, this example illustrates one of the reasons that multiple keys can be activated at CCD 410 for some periods.

In one or more embodiments, decryption key 495A can be deactivated when a first packet encrypted with next encryption key 475B is received. This may happen at the time when 495A expires or shortly after if there are delays in the network communications. For this reason, in one or more embodiments, decryption key 495A is not deactivated right away when it expires, e.g., at 3 PM.

In other embodiments, a delay in key deactivation can also be caused by CDD 410 not having received the next encryption key 475B, or the assurance value for decryption key 495B is not high enough to enable a switch.

It should be noted that, the expiration time of a key (e.g., 3 PM for decryption key 495A) does not, in all embodiments, prevent the key from being used. In an example where the use of an expired key could be required to maintain encrypted communications with CDD 450, CDD 450 can have a communication channel interruption of connection 456 from key source 430 that is similar to interruption 355 discussed above, e.g., even though a connection 457 functions to deliver content item 480 to CDD 450, communication can be interrupted with key source 430 such that, for example, key 475B has not been delivered before the expiration of key 475A. In this example, no content items encrypted with key 475B can be delivered to CCD 410, e.g., because CDD 450 doesn't have access to key 475B for encrypting. At least because of this and notwithstanding the expiration time of Current key, CCD 410 can maintain key 495A as active for decrypting, even after the expiration time of the key.

A delayed deactivation of key 495A, as discussed above, is illustrated in FIG. 5 with the termination of arrow 520A at an interval after its active life is supposed to end at 3 PM. An additional delay on deactivating 495A beyond the time when the first packet encrypted with 475B is received can be caused to account for network delays, where a packet encrypted with encryption key 475A may still be traveling after a first packet encrypted with 475B has arrived. This type of delay can be configured in CCD 410 as a delay time, e.g., 2 minutes. In one or more embodiments, having an overlap of available active decryption keys on CCD 410 (e.g., overlapping portions of arrows 520A-B discussed above) can affect the key switching procedures used by CDD 450, as discussed with FIG. 6 below.

Continuing the discussion of key 495B, as discussed above, after arrow 520A ends, key 495A is deactivated on CCD 410, and key 495B can be used to decrypt content items from CDD 450. It is important to note that, although key 495A has been deactivated on CCD 410, this key has been distributed, e.g., using a multicast protocol to additional CCDs in the group, and in one or more embodiments, different CCDs can control their local deactivation of key 495A, and other decryption keys based on local conditions. In an alternative embodiment, decryption keys can be pushed to group members using a unicast protocol.

At time 3 PM, according to the 60 minute key generation interval of key source 430, key generation 510C event occurs, generating key 495C. At event 515C, in this example, because key 495C is not an initial key (e.g., key 495A and key 495B, pulled from key source 430), key 495C can be pushed to CCD 410 by key source 430 as soon as it is generated. Alternatively, CCD 410 can be configured to pull new decryption keys based on information related to the previous keys (e.g., expiration time of the key prior to the last downloaded), information that comes from the key source when a key is distributed.

Because key 495C has an ATD of 30 minutes, after generation at 3 PM, key 495C becomes active on CCD 410 at time 3:30 M. As depicted on timeline 500 with arrows 520B-C, after the activation of key 495C, an overlap period commences until the deactivation of key 495B. As illustrated with arrows 520B-C, another approach to deactivating keys can be to seek to enforce a period of overlap, e.g., a set amount, a minimum amount of overlap, and a maximum amount of overlap. Thus, as depicted, the deactivation of key 495B (and thus, the period of overlap with key 495C) can be selected based on a minimum time length over the overlapping portion of arrows 520B-C. It should be noted that, all of the deactivation approaches discussed herein can be combined to advance goals including, but not limited to, minimizing a likelihood of not having an appropriate key available. It should also be noted that the interval as which new keys are generated by key source 430 and the validity time of each key are selected such that the likelihood of the key encryption being broken can be reduced. This is decided by the policy enforced on the key source 430.

At key generation event 510D, key 495D is generated and, following the example approach described above with the key 495C key, in event 515D, key 495D is pushed after generation to members of the CCD group, including CCD 410. In an alternative embodiment, as described above, CCD 410 can be configured to pull decryption keys at particular times, e.g., 30 minutes before the expiration time of a previous key, this being the decryption key 495C expiring at 5 PM or when the key before the previous key (e.g., decryption key 495B) expires.

As noted with FIG. 3 above, in one or more embodiments, upon receipt of a decryption key based on a pull request, CCD 410 can send an ACK 320 to key source 430 to acknowledge receipt of the Next3 decryption key. As described further with FIG. 6 below, in one or more embodiments, key source 430 can aggregate ACKs 320 received from the group of CCDs and generate an assurance value 325 that can represent the likelihood that all members of the group of CCDs have received a decryption key (e.g., a decryption key symmetrically matching the encryption key following the next, to which CDD 450 is evaluating whether to switch).

Also similar to key 495C, the 30 minute ATD of key 495D dictates that, as shown in arrow 520D, key 495D can be activated for use on CCD 410 at time 4:30 PM. In this example, the lifespan of key 495D is to 6 PM, and CCD 410 can accept packets encrypted with encryption key 475D from 4:30 PM on, and after an interval discussed above, key 495C can be deactivated.

FIG. 6 illustrates an example timeline 600 for CDD 450 and key source 430 that can describe the selection of encryption keys, e.g., encryption keys 475A-D. Discussed above, related FIG. 5 illustrates an example timeline 500 for CCD 410, describing events that can occur at CCD 410 in relation to the actions described below in timeline 600. For purposes of brevity, description of like elements and/or processes employed in other embodiments is omitted.

The timeline 600 depicts events occurring at key source 430 and at the CDD 450 and has sections 650 and 660 respectively detailing these events. As noted above, in one or more embodiments, CCD 410 and CDD 450 can operate as clients of key source 430, e.g., requesting encryption keys 475A-C and decryption keys 495A-C respectively (e.g., issuing pull requests for keys), and receiving keys (e.g., receiving keys either pushed without being requested or in response to the pull request).

Key source section 650 of timeline 600 has key generation events 510A-D generating keys as described with FIG. 5 above. At event 615A, as noted above, CDD/CCD can be powered up and can request keys from key source 430. It may be that key source 430 just has one active key 475A/ 495A at the time, or it may have 2 keys, 475A-B and 495A-B available and in this example, key source 430 can provide both. CCD/CDD can request that key source 430 provide a generated encryption key 475A for encryption of content item 480. Like CCD 410 requiring a current key to decrypt content item 480, CDD can require complementary encryption key 475A to encrypt content item 480 for secure delivery to CCD 410.

Like CCD 410 above, in general, delivery of keys can be based either on a request to key source 430 (e.g., a pull request), or based on key source 430 delivering the key without a request at an interval or after an event (e.g., a push of the key). Similar to CCD 410 above, a pull request can be used to request the keys associated with event 615B, e.g., as the initial keys used, a pull request can be required. Similar to CCD 410 above, at event 615B, CDD 450 can use a pull request for two keys to receive encryption keys 475A-B.

Similar to CCD 410 discussed above, encryption keys can have an APD (e.g., 30 minutes) and an expiration time. For encryption keys, in one or more embodiments being active can indicate that the key can be used for encryption of content item 480 for secure delivery to CCD 410. In one or more embodiments, in contrast to decryption keys, where multiple keys can be active at the same time (e.g., arrows 520A-B), and able to be used to decrypt individual content items 480 (e.g., decrypt encrypted packets based on a packet header specifying which decryption key to use), only one of the activated encryption keys can be used to encrypt content items 480. Because the encryption keys used generally have sequential expiration times based on the time they are received (e.g., 475A expiring at 3 PM, key 475B at 4 PM, 475C at time 5 PM) the keys are generally used in the order they are received.

It should be noted that there is no overlap of arrows 620A-D. In one or more embodiments, in contrast with the main aspects of FIG. 5 discussed above, e.g., balancing considerations to adjust a likelihood of receiving encrypted content items 480 for which no decryption key is available, the main aspects of FIG. 6 and CDD 450 generally, include the frequency of changing the key used for encryption, for example, based on when a newer key becomes active, but also an assurance that corresponding decryption corresponding to this key has been successfully delivered to all members of the group to which CDD intends to send data, e.g., the assurance value discussed above. Competing considerations that can be analyzed by one or more embodiments can include, but are not limited to, maintaining service, e.g., and minimizing a likelihood that a CCD member of the group of CCDs will receive a content item 480 and not have an appropriate decryption key available.

Returning to the example of FIG. 6, at event 615B, when encryption keys 475A-B are received, like decryption keys 495A-B described above, key 475A is active when it is received, and 475B is active at time 2:30 PM. Based on being active, encryption key 475A can be used to encrypt the first part (e.g., packet) of content item 480 and transmit (e.g., by employing connection 457) the encrypted part of content item 480 to CCD 410. As described above with FIG. 5, CCD can receive the encrypted part, determine the decryption key required has been received (e.g., key 495A), and use the key to decrypt content item 480.

This process of encrypting portions of content item 480 and communicating the encrypted portions to be decrypted by CCD 410 can continue with periodic switches from a current encrypting key to the next received encrypting key, e.g., arrows 620A-D. As noted above, in one or more embodiments, CDD 450 can use different approaches to switching between keys 475A-D used for encryption.

As noted throughout this disclosure, if CDD 450 switches to a new encryption key before an associated decryption key is available at a CCD 410, CCD 410 will be unable to decrypt the content item 480 encrypted using the new encryption key. One approach than can be used by one or more embodiments uses the assurance value 325 discussed above with FIG. 3. As noted above, in one or more embodiments, key source 430 can determine the assurance value by comparing received ACKs 320 from CCDs in the multicast group to the number of decryption keys 475B that were distributed to these CCDs, including CCD 410. Based on this number, key source can determine an assurance value 325 that can provide an indication as to how many of the CCDs in the multicast group received the next, 475B key.

In one or more embodiments, the assurance value can be a reporting of the actual number of received ACKs and the expected number based on keys being sent out. In an example from FIG. 6, at 3 PM, as depicted by arrow 620B, CDD 450 is using active encryption key 475B for encryption, and the next encryption key 475C is received. Referring back to FIG. 5, the APD period of decryption key 495C ends at 3:30 PM, and as depicted by arrows 520B-C, both keys 495B-C are active and available for decryption at CCD 410.

In one or more embodiments, CDD 450 can have information corresponding to the expected time that decryption key 495C is to be active on CCDs in the group, and one approach to switching used can switch to encryption key 475C as soon as this time arrives.

In alternative embodiments, the CCDs of the multicast group, can issue a pull request at an appropriate time (e.g., at time 150, when decryption key 475C is generated by key source 430) and, when the requested keys 475C are received by the CCDs, the CCDs send ACKs 320 to key source 430. If ACKs are received from all the CCDs relying on receiving key 475C, the assurance value can be calculated to be 100%. Based on this value, in one or more embodiments CDD can switch to encryption key 475C without further consideration.

In another example, if a number of CCDs send ACKs is fewer than the number of keys 495C (e.g., CCD 410 does not respond, out of ten CCDs), then a lower assurance value can be determined, e.g., 90%. In one or more embodiments, key source 430 can send out decryption key 495C multiple times based on this assurance value, and because it is only time 3 PM at this point in the example (e.g., CDD 450 has information indicating that key 495B does not expire until 4 PM), CDD can continue using key 475B and getting updated assurance values. As noted above, in one or more embodiments, the CCDs in the group can continue using key 495B even after expiration at 4 PM, so, to maintain connectivity with all members of the group, if the assurance value does not increase to 100%, CDD 450 can continue using key 475B without changing.

In alternative embodiments, the security risks of using an expired key can cause an evaluation of multiple factors, including, but not limited to, the length of time the key has been used, the strength of the key, the assurance value (e.g., how many CCDs could be disconnected), and the security sensitivity of the data. Thus, in an example, when an expired key is maintained in use for a time period over a threshold, with an assurance value that is above a threshold, and with a key strength that is under a threshold, the alternative embodiment can switch to encryption with encryption key 475C.

Turning now to an example implementation of assurance value 325, as noted with FIG. 3 above, the assurance value can be a variety of different metrics, including, but not limited to, a key delivery assurance (KDA) factor. In one or more embodiments, key source 430 can be a key distribution center (KDC), that determines the KDA based on information received from all data communications group members regarding the receipt of the latest distributed symmetric key. As described above, different CDD implementations can use the KDA for different purposes, including requiring it to be 100% before switching to a new key, and performing the evaluations described above.

Figure 9:
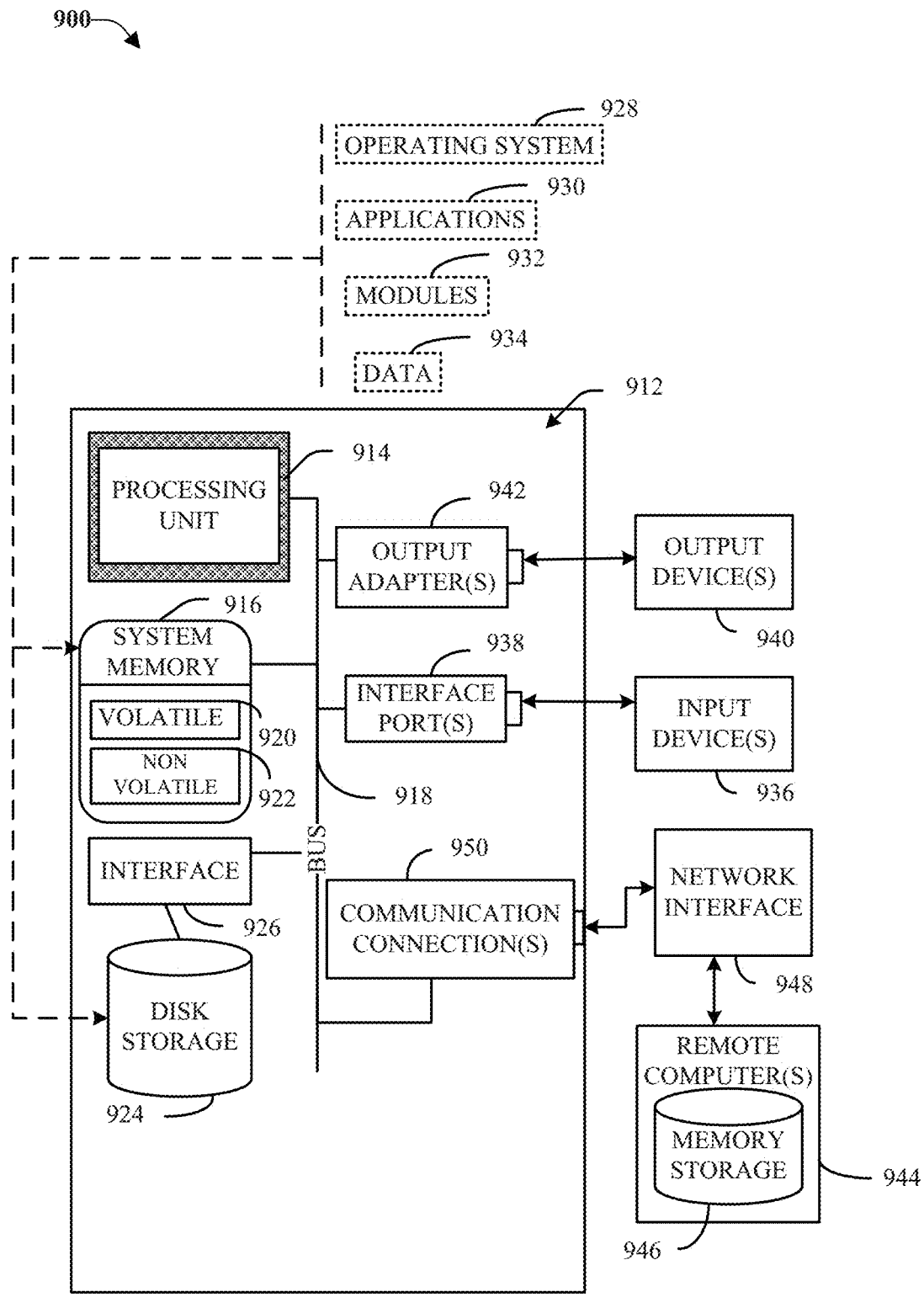
FIG. 9 is a schematic block diagram of a sample-computing environment.
Figure 10:
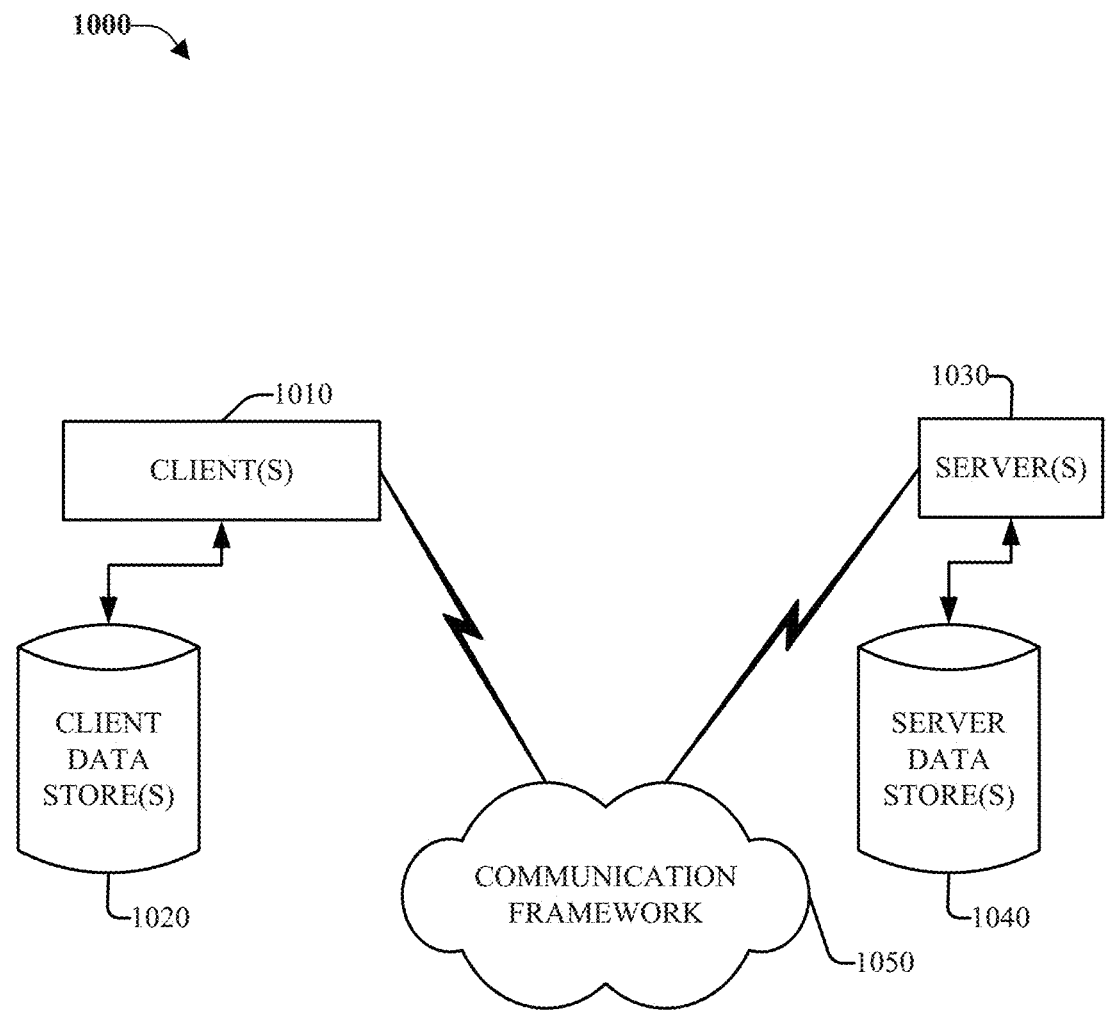
FIG. 10 depicts a diagram of an example client-server network environment in which various aspects of the disclosed subject matter can be practiced.

To provide a context for the various aspects of the disclosed subject matter, FIGS. 9 and 10, and the following discussion, are intended to provide a brief, general description of example, suitable environments in which the various aspects of the disclosed subject matter can be implemented. While the subject matter has been described above in the general context of computer-executable instructions of a computer program that runs on a computer or computers, those skilled in the art will recognize that the disclosed subject matter also can be implemented in combination with other program modules. Generally, program modules comprise routines, programs, components, data structures, etc. that performs particular tasks or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1520 (see below), nonvolatile memory 1522 (see below), disk storage 1524 (see below), and memory storage 1546 (see below). Further, nonvolatile memory can comprise read only memory, programmable read only memory, electrically programmable read only memory, electrically erasable read only memory, flash memory, or solid state memory (e.g., solid state drive). Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 7:
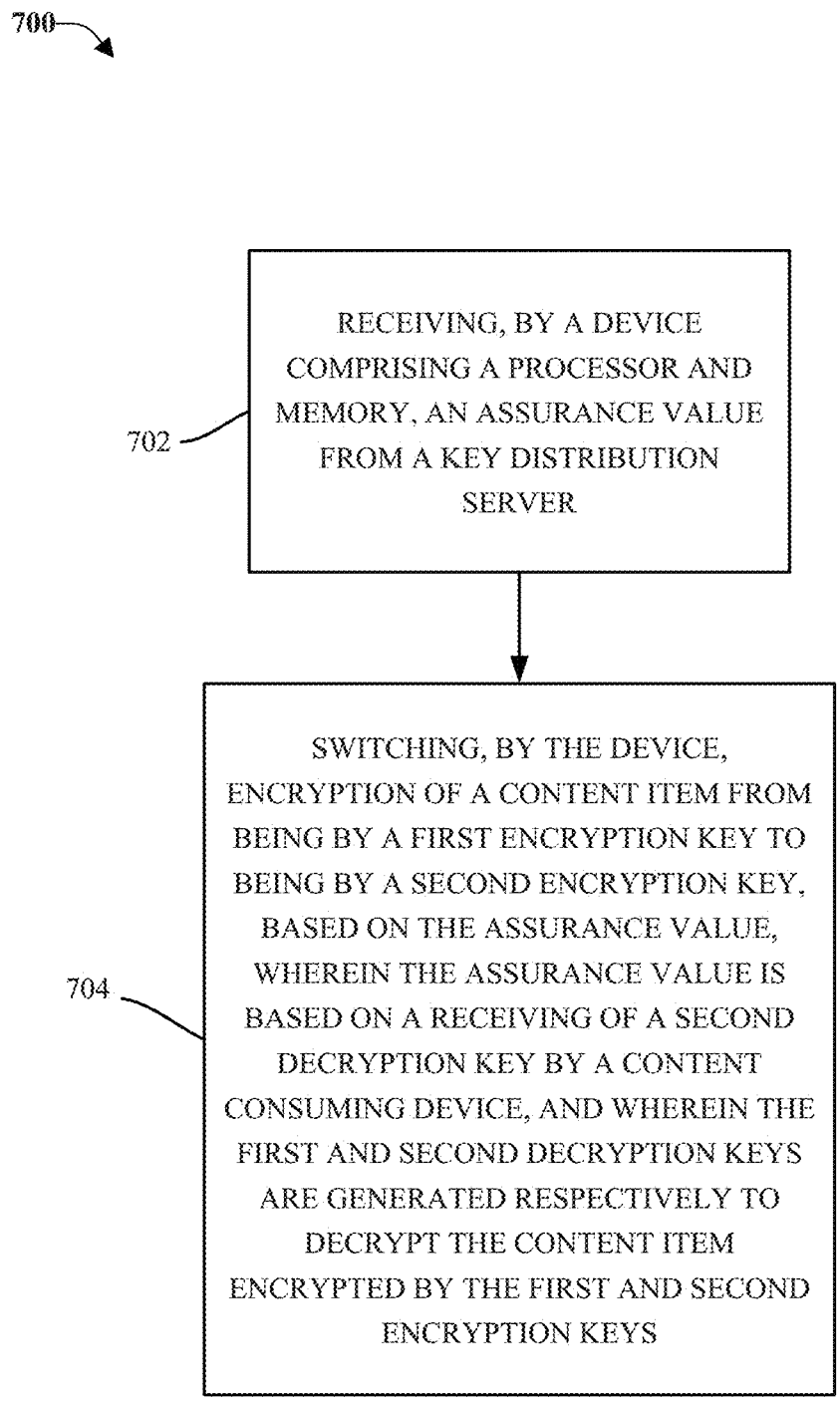
FIG. 7 illustrates a flow diagram of an example method that can facilitate switching encryption keys based on an assurance value, in accordance with one or more embodiments, in accordance with aspects of the subject disclosure.

FIG. 7 illustrates a flow diagram of an example method 700 that can facilitate switching encryption keys based on an assurance value, in accordance with one or more embodiments. For purposes of brevity, description of like elements and/or processes employed in other embodiments is omitted.

At 702, example method 700 can receive, by a device (e.g., CDD 450) comprising a processor 160A and memory 165A, an assurance value 325 from a key distribution server (e.g., key source 430). At 704, example method 700 can switch, by the device, encryption (e.g., by encryptor 154) of a content item (e.g., content item 480) from being by a first encryption key (e.g., key 475A) to being by a second encryption key (e.g., key 475B), based on the assurance value, wherein the assurance value is based on a receiving (e.g., based on ACK 320) of a second decryption key (e.g., key 495B) by a CCD 410, and wherein the first (e.g., key 495A) and second decryption keys (e.g., key 495B) are generated respectively to decrypt the content item encrypted by the first and second encryption keys.

Figure 8:
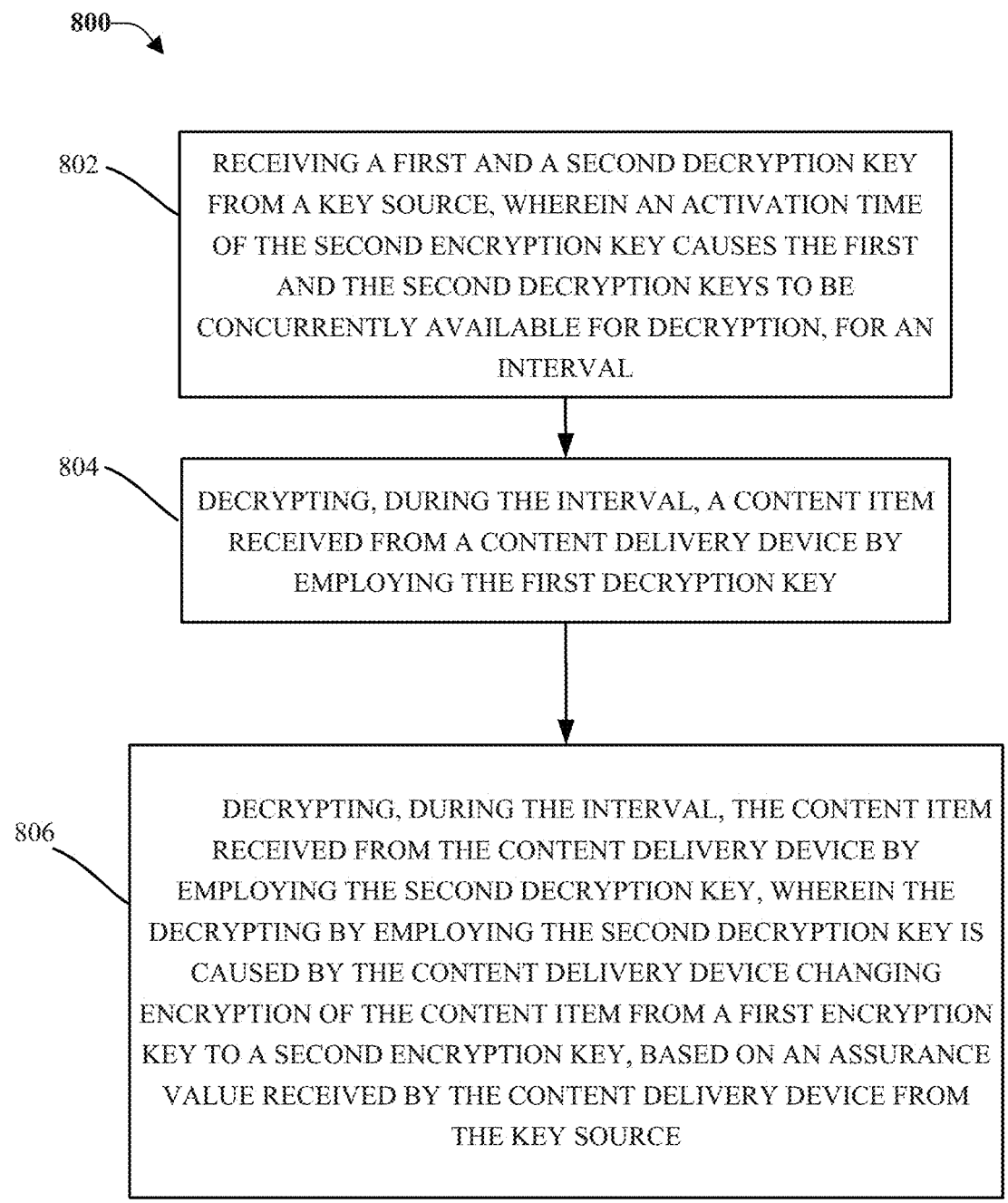
FIG. 8 illustrates a flow diagram of example operations that, when embodied in executable instructions executed by a processor can cause the processor to facilitate the switching of encryption keys based on an assurance value received by a CDD, in accordance with aspects of the subject disclosure.

FIG. 8 illustrates a flow diagram of example operations that, when embodied in executable instructions executed by a processor can cause the processor to facilitate the switching of encryption keys based on an assurance value received by a CDD. For purposes of brevity, description of like elements and/or processes employed in other embodiments is omitted.

At 802, the operations can receive a first (e.g., key 495A) and a second decryption key (e.g., key 495B) from a key source 430, wherein an activation time of the second encryption key causes the first and the second decryption keys to be concurrently available for decryption, for an interval (e.g., as depicted by the overlap of arrows 520B-C).

At 804, the operations can decrypt, during the interval, a content item 480 received from CDD 450 by employing the first key.

At 806, the operations can decrypt, during the interval, the content item 480 received from CDD 450 by employing the second decryption key, wherein the decrypting by employing the second decryption key is caused by CDD 450 changing encryption of the content item from a first encryption key to a second encryption key, based on assurance value 325 received by CDD 450 from key source 430.

FIG. 9 illustrates a block diagram of a computing system 900 operable to execute the disclosed systems and methods in accordance with example embodiments of the present application. Computer 912 can comprise a processing unit 914, a system memory 916, and a system bus 918. System bus 918 can couple system components including, but not limited to, system memory 916 to processing unit 914. Processing unit 914 can be any of various available processors. Dual microprocessors and other multiprocessor architectures also can be employed as processing unit 914.

System bus 918 can be any of several types of bus structure(s) including a memory bus or a memory controller, a peripheral bus or an external bus, or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 916 can comprise volatile memory 920 and nonvolatile memory 922. A basic input/output system, containing routines to transfer information between elements within computer 912, such as during start-up, can be stored in nonvolatile memory 922. By way of illustration, and not limitation, nonvolatile memory 922 can comprise read only memory, programmable read only memory, electrically programmable read only memory, electrically erasable read only memory, or flash memory. Volatile memory 920 can comprise read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 912 can also comprise removable/non-removable, volatile/non-volatile computer storage media. FIG. 9 illustrates, for example, disk storage 924. Disk storage 924 can comprise devices like a magnetic disk drive, floppy disk drive, tape drive, flash memory card, or memory stick. In addition, disk storage 924 can comprise storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 924 to system bus 918, a removable or non-removable interface is typically used, such as interface 926.

Computing devices typically comprise a variety of media, which can comprise computer-readable storage media or communications media, which two terms are used herein differently from one another as follows.

Computer-readable storage media can be any available storage media that can be accessed by the computer and can comprise both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and can comprise any information delivery or transport media. The term "modulated data signal" or signals refers to a signal that has one or more of its characteristics set or changed in such a manner as to encode information in one or more signals. By way of example, and not limitation, communication media can comprise wired media, such as a wired network or direct-wired connection, and wireless media such as acoustic, RF, infrared and other wireless media.

It can be noted that FIG. 9 describes software that acts as an intermediary between users and computer resources described in suitable operating environment 900. Such software can comprise an operating system 928. Operating system 928, which can be stored on disk storage 924, acts to control and allocate resources of computer system 912. System applications 930 take advantage of the management of resources by operating system 928 through program modules 932 and program data 934 stored either in system memory 916 or on disk storage 924. It is to be noted that the disclosed subject matter can be implemented with various operating systems or combinations of operating systems.

A user can enter commands or information into computer 912 through input device(s) 936. As an example, a user interface can be embodied in a touch sensitive display panel allowing a user to interact with computer 912. Input devices 936 can comprise a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 914 through system bus 918 by way of interface port(s) 938. Interface port(s) 938 comprise, for example, a serial port, a parallel port, a game port, a universal serial bus, an infrared port, a Bluetooth port, an IP port, or a logical port associated with a wireless service, etc. Output device(s) 940 use some of the same type of ports as input device(s) 936.

Thus, for example, a universal serial busport can be used to provide input to computer 912 and to output information from computer 912 to an output device 940. Output adapter 942 is provided to illustrate that there are some output devices 940 like monitors, speakers, and printers, among other output devices 940, which use special adapters. Output adapters 942 comprise, by way of illustration and not limitation, video and sound cards that provide means of connection between output device 940 and system bus 918. It should be noted that other devices or systems of devices provide both input and output capabilities such as remote computer(s) 944.

Computer 912 can operate in a networked environment using logical connections to one or more remote computers, such as remote computer(s) 944. Remote computer(s) 944 can be a personal computer, a server, a router, a network PC, cloud storage, cloud service, a workstation, a microprocessor based appliance, a peer device, or other common network node and the like, and typically can comprise many or all of the elements described relative to computer 912.

For purposes of brevity, only a memory storage device 946 is illustrated with remote computer(s) 944. Remote computer(s) 944 is logically connected to computer 912 through a network interface 948 and then physically connected by way of communication connection 950. Network interface 948 encompasses wire or wireless communication networks such as local area networks and wide area networks. Local area network technologies can comprise fiber distributed data interface, copper distributed data interface, Ethernet, Token Ring and the like. Wide area network technologies can comprise point-to-point links, circuit-switching networks like integrated services digital networks and variations thereon, packet switching networks, and digital subscriber lines. As noted below, wireless technologies may be used in addition to or in place of the foregoing.

Communication connection(s) 950 refer(s) to hardware/software employed to connect network interface 948 to bus 918. While communication connection 950 is shown for illustrative clarity inside computer 912, it can also be external to computer 912. The hardware/software for connection to network interface 948 can comprise, for example, internal and external technologies such as modems, including regular telephone grade modems, cable modems and digital subscriber line modems, integrated services digital network adapters, and Ethernet cards.

FIG. 10 is a schematic block diagram of a sample-computing environment 1000 with which the subject matter of this disclosure can interact. The system 1000 can comprise one or more client(s) 1010. The client(s) 1010 can be hardware or software (e.g., threads, processes, computing devices). The system 1000 also can comprise one or more server(s) 1030. Thus, system 1000 can correspond to a two-tier client server model or a multi-tier model (e.g., client, middle tier server, data server), amongst other models. The server(s) 1030 can also be hardware or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 can comprise a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer or computers, those skilled in the art will recognize that this disclosure also can or may be implemented in combination with other program modules. Generally, program modules can comprise routines, programs, components, data structures, etc. that perform particular tasks or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, or a computer. By way of illustration and not limitation, both an application running on a server and the server can be a component. One or more components may reside within a process or thread of execution and a component may be localized on one computer or distributed between two or more computers. In addition, these components can execute from various computer readable media having various data structures stored thereon. The components may communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term (e.g., including, but not limited to), rather than a closed or exclusive term. The term "include" can be substituted with the term "comprise" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "operator," "switchman," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above can comprise examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor,
   perform the following operations:
   receiving a first and a second decryption key from a key source, wherein an activation time of a second encryption key causes the first and the second decryption keys to be concurrently available for decryption, for a time interval;
   decrypting, during the time interval, a content item received from a content delivery device by employing the first decryption key, wherein the content item is encrypted using a first encryption key; and
   decrypting, during the time interval, the content item received from the content delivery device by employing the second decryption key, wherein the decrypting by employing the second decryption key is caused by the content delivery device changing encryption of the content item from the first encryption key to the second encryption key, based on an assurance value received by the content delivery device from the key source.

2. The device of claim 1, wherein the first decryption key and the first encryption key are symmetric keys.

3. The device of claim 1, wherein the first decryption key has an expiration time that is earlier than the second decryption key.

4. The device of claim 1, wherein the operations further comprise selecting for decryption of the content item, the second decryption key, based on the content item.

5. The device of claim 1, wherein the operations further comprise communicating, based on the second decryption key being received, an acknowledgement signal to the key source.

6. The device of claim 5, wherein the assurance value is based on the acknowledgement signal.

7. The device of claim 6, wherein the assurance value is a key delivery assurance value.

8. The device of claim 6, wherein the assurance value is further based on another acknowledgement signal from a content consuming device based on the content consuming device receiving the second encryption key.

9. The device of claim 5, wherein the operations further comprise requesting the second decryption key from the key source, wherein the communicating the acknowledgement signal is further based on the second decryption key having been requested.

\* \* \* \* \*